(12) United States Patent
Martin et al.

(10) Patent No.: US 9,764,272 B2
(45) Date of Patent: Sep. 19, 2017

(54) SYSTEMS AND METHODS FOR UTILIZING TURBINE SYSTEMS WITHIN GAS PROCESSING SYSTEMS

(71) Applicant: Energy Recovery Inc., San Leandro, CA (US)

(72) Inventors: Jeremy Grant Martin, Oakland, CA (US); John Sienkiewicz, San Mateo, CA (US); Prem Krish, Foster City, CA (US); Ying Ma, San Leandro, CA (US); Mark Richter, Orinda, CA (US); Felix Winkler, Berkeley, CA (US)

(73) Assignee: ENERGY RECOVERY, INC., San Leandro, CA (US)

( * ) Notice: Subject to any disclaimer, the term of this patent is extended or adjusted under 35 U.S.C. 154(b) by 451 days.

(21) Appl. No.: 14/525,081

(22) Filed: Oct. 27, 2014

(65) Prior Publication Data

US 2015/0118131 A1    Apr. 30, 2015

Related U.S. Application Data (60) Provisional application No. 61/896,255, filed on Oct. 28, 2013.

(51) Int. Cl.
*F16D 33/00* (2006.01)
*B01D 53/14* (2006.01)
(Continued)

(52) U.S. Cl.
CPC ..... *B01D 53/1456* (2013.01); *B01D 53/1412* (2013.01); *B01D 53/1468* (2013.01); *B01D 53/1475* (2013.01); *B01D 53/18* (2013.01); *C10L 3/10* (2013.01); *F03B 15/20* (2013.01); *B01D 2252/2028* (2013.01);
(Continued)

(58) Field of Classification Search
CPC ...... B01D 53/1456; B01D 53/18; F03B 15/20
See application file for complete search history.

(56) References Cited

U.S. PATENT DOCUMENTS

| | | | |
|---|---|---|---|
| 3,602,603 A | 8/1971 | Fukasu et al. | |
| 4,150,962 A | 4/1979 | Colton | |

(Continued)

FOREIGN PATENT DOCUMENTS

| | | |
|---|---|---|
| DE | 3443491 | 5/1986 |
| FR | 2137359 | 12/1972 |

OTHER PUBLICATIONS

International Search Report & Written Opinion for International Application No. PCT/US2014/062535 mailed Jan. 30, 2015.

*Primary Examiner* — Michael Leslie
(74) *Attorney, Agent, or Firm* — Fletcher Yoder, P.C.

(57) ABSTRACT

A system includes a solvent gas processing system having a high pressure reaction vessel configured to remove an acid gas from an untreated feed gas using a solvent in a lean solvent fluid stream. The system includes a high pressure reaction vessel is configured to output a treated clean gas and a first flow of a high pressure fluid stream via a first flow path. The system includes a turbine having a main nozzle, an auxiliary nozzle, and an outlet. The main nozzle is configured to receive a second flow of the high pressure fluid stream from the first flow path via a main flow path. The system includes an auxiliary nozzle valve disposed along an auxiliary flow path. The auxiliary nozzle valve is configured to control a third flow of the high pressure fluid stream into the auxiliary nozzle of the turbine.

20 Claims, 3 Drawing Sheets

(51) Int. Cl.
  *B01D 53/18*  (2006.01)
  *C10L 3/10*  (2006.01)
  *F03B 15/20*  (2006.01)

(52) U.S. Cl.
  CPC .... *B01D 2256/24* (2013.01); *B01D 2256/245* (2013.01); *B01D 2257/304* (2013.01); *B01D 2257/306* (2013.01); *B01D 2257/504* (2013.01); *B01D 2259/124* (2013.01); *F05B 2220/602* (2013.01)

(56) References Cited

U.S. PATENT DOCUMENTS

2013/0019530 A1  1/2013  Favilli et al.
2013/0032029 A1  2/2013  Mak

SYSTEMS AND METHODS FOR UTILIZING TURBINE SYSTEMS WITHIN GAS PROCESSING SYSTEMS

CROSS REFERENCE TO RELATED APPLICATION

This application is a non-provisional of U.S. Provisional Patent Application No. 61/896,255 entitled "Control System for a Turbine Based Level Control in Amine Gas Processing," filed Oct. 28, 2013, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The subject matter discloses herein relates to turbine systems, and more particularly, to systems and methods for controlling operating parameters of a fluid within gas processing systems, such as within acid gas removal systems.

Within various industrial applications, high pressure reaction vessels may be utilized for various gas processing applications. For example, within various petrochemical applications, natural gas processing applications, and other industrial processing plant applications, acid gas removal systems may utilize a high pressure reaction vessel (e.g., high pressure reaction vessel) to remove sour gas components of a desired gas. Indeed, a natural gas emerging from a natural reservoir may contain varying amounts of sour gases (e.g., carbon dioxide, hydrogen sulfide, etc.). It may be beneficial for the high pressure reaction vessels to remove the sour gas components of the natural gas to help reduce the effects of the sour gases on or within these industrial applications.

In some situations, a liquid solvent may exit the high pressure reaction vessel and may be processed before being routed back into the high pressure reaction vessel as a reactant. For example, the liquid solvent may be passed through a pressure reduction mechanism which modulates in order to control a liquid level within the high pressure reaction vessel. Within acid gas removal systems, various operating parameters of a liquid solvent exiting the high pressure reaction vessel may be adjusted to help provide for a continuous system that removes sour gas components from the feed gas. In certain situations, the pressures and temperatures of the liquid solvent are increased or decreased before or after the sour gas components are stripped from the feed gas. However, mechanisms generally utilized to control the operating parameters of the liquid solvent, such as the pressure reduction mechanism, may be improved to increase efficiency and recover lost energy. Accordingly, it may be beneficial to provide systems and methods for improving mechanisms utilized to control the operating parameters of liquid solvents exiting high pressure reaction vessels within various industrial processes.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements The embodiments described herein generally relate to industrial applications that utilize high pressure reaction vessels in various gas processing techniques. For example, within various petrochemical applications, natural gas processing applications, and other industrial processing plant applications, high pressure reaction vessels may be utilized to process a desired gas with a liquid solvent. In particular, the liquid level of the high pressure reaction vessels within these industrial systems may be regulated and monitored. For example, in certain embodiments, a liquid solvent may be removed from the high pressure reaction vessel and passed through a pressure reduction valve before being routed back into the high pressure reaction vessel as a reactant. Further, the pressure reduction valve may be configured to regulate the liquid level of the high pressure reaction vessel by monitoring and regulating the amount of liquid solvent removed from the high pressure reaction vessel. However, the mechanisms generally utilized to control the operating parameters of the liquid solvent, such as the pressure reduction mechanism, may be improved to increase efficiency and recover lost energy. Accordingly, it may be beneficial to provide for a turbine system that is configured to control or regulate the operating parameters of the liquid solvent exiting from a high pressure reaction vessel, as further described below.

It should be noted that in the illustrated examples, descriptions, and embodiments, an acid gas removal system is utilized as an example of an industrial system having a turbine system configured to regulate the operating parameters of the liquid solvent exiting from a high pressure reaction vessel. However, the embodiments, systems, and methods described herein are generally applicable to any industrial process through which a liquid solvent is routed out of a high pressure reaction vessel. Further, these embodiments, systems, and methods described herein are generally applicable to any industrial process in which a liquid solvent is routed out of a high pressure reaction vessel and is passed through a pressure reduction valve configured to control the liquid level in the high pressure reaction vessel.

With the forgoing in mind, acid gas removal systems may be an example of an industrial process having a turbine system configured to regulate the operating parameters of a liquid solvent (e.g., liquid stream, liquid effluent, etc.) exiting from a high pressure reaction vessel. Further, the turbine system may be configured to regulate the operating parameters of the high pressure reaction vessel by controlling or regulating the amount of liquid solvent removed from the high pressure reaction vessel for further processing. Acid gas removal systems may be utilized in a variety of industrial applications, such as petrochemical or chemical applications, natural gas processing applications, industrial plant applications, and so forth. In particular, the acid gas removal systems may include a turbine system having a turbine and one or more valves that are configured to control a flow of a liquid solvent within the acid gas removal system. Furthermore, the turbine system may help regulate the pressure and the pressure drop of the liquid solvent stream as it is processed through the acid gas removal system. In this manner, the turbine system may be configured to replace other mechanisms within the acid gas removal systems typically utilized for pressure reduction of the desired liquid, such as, for example, a pressure reducing valve.

Acid gas removal systems may generally be utilized to remove sour gas components of a desired feed gas, thereby converting the feed gas into a clean gas (e.g., sweet gas) substantially free of sour gas components. For example, virgin natural gas is a type of desired feed gas derived from natural gas reservoirs that may include various amounts of sour gases, such as carbon dioxide or hydrogen sulfide. The acid gas removal system may be configured to remove the sour gas components of the natural gas to help reduce the effects of the sour gases on the industrial system or process. Typically, acid gas removal systems utilize a series of processes involving aqueous solutions of various fluid solvents (e.g., alkylamines, amines) to remove the sour gas components. Specifically, sour gas components of a desired feed gas are absorbed by the solvent aqueous solutions at high pressures (e.g., approximately between 1000 psi and 1500 psi) and relatively low temperatures (e.g.,). Likewise, the sour gas components are released by the solvent aqueous solutions at low pressures (e.g. approximately near atmospheric pressures) and relatively higher temperatures (e.g.,). Accordingly, acid gas removal systems typically include a circulative process that reuses the aqueous solvent solutions. For example, the sour gas components of a desired feed gas, such as natural gas, are brought into contact with a solvent solution at high pressures (e.g., approximately between 1000 psi and 1500 psi) and relatively low temperatures (e.g.,) within a high pressure reaction vessel, which results in the solvent solution absorbing the sour gas components and forming a clean (e.g., sweet) feed gas. The sweet gas is produced by the acid gas removal system. Further, the solvent solution that has absorbed the sour gas components (e.g., high pressure rich solvent fluid stream) may exit the high pressure reaction vessel at high pressures and low temperatures. Lowering the pressure and increasing the temperature of the high pressure rich solvent fluid may help strip the high pressure rich solvent of the absorbed sour gas components, thereby allowing the solvent fluid stream to be recirculated into the high pressure reaction vessel. Typically, in certain acid gas removal systems and situations, a pressure reducing valve may be utilized to reduce the pressure of the high pressure rich solvent fluid. However, the pressure reducing valve may not utilize the energy generated with the pressure drop of the rich solvent fluid, thereby resulting in a loss of efficiency.

As noted above, in embodiments described herein, the turbine system may be configured to help reduce the pressure of the high pressure rich solvent fluid. Indeed, as further described in detail below, in certain situations the turbine system may be disposed to help replace the pressure reducing valve within various acid gas removal systems. In particular, the turbine system may be configured to recover a portion of the pressure energy generated when the pressure of the rich solvent solution is reduced, and may convert this pressure energy into rotational mechanical energy. In certain embodiments, the rotational mechanical energy may be utilized and/or converted into other forms of energy within the acid gas removal system and/or the industrial system. For example, the rotational energy generated by the turbine system may be utilized to drive a pump to pressurize additional process fluids within the system, to convert to electrical energy through driving an electric generator, or may be used in any other manner within the acid gas removal system.

Figure 1:
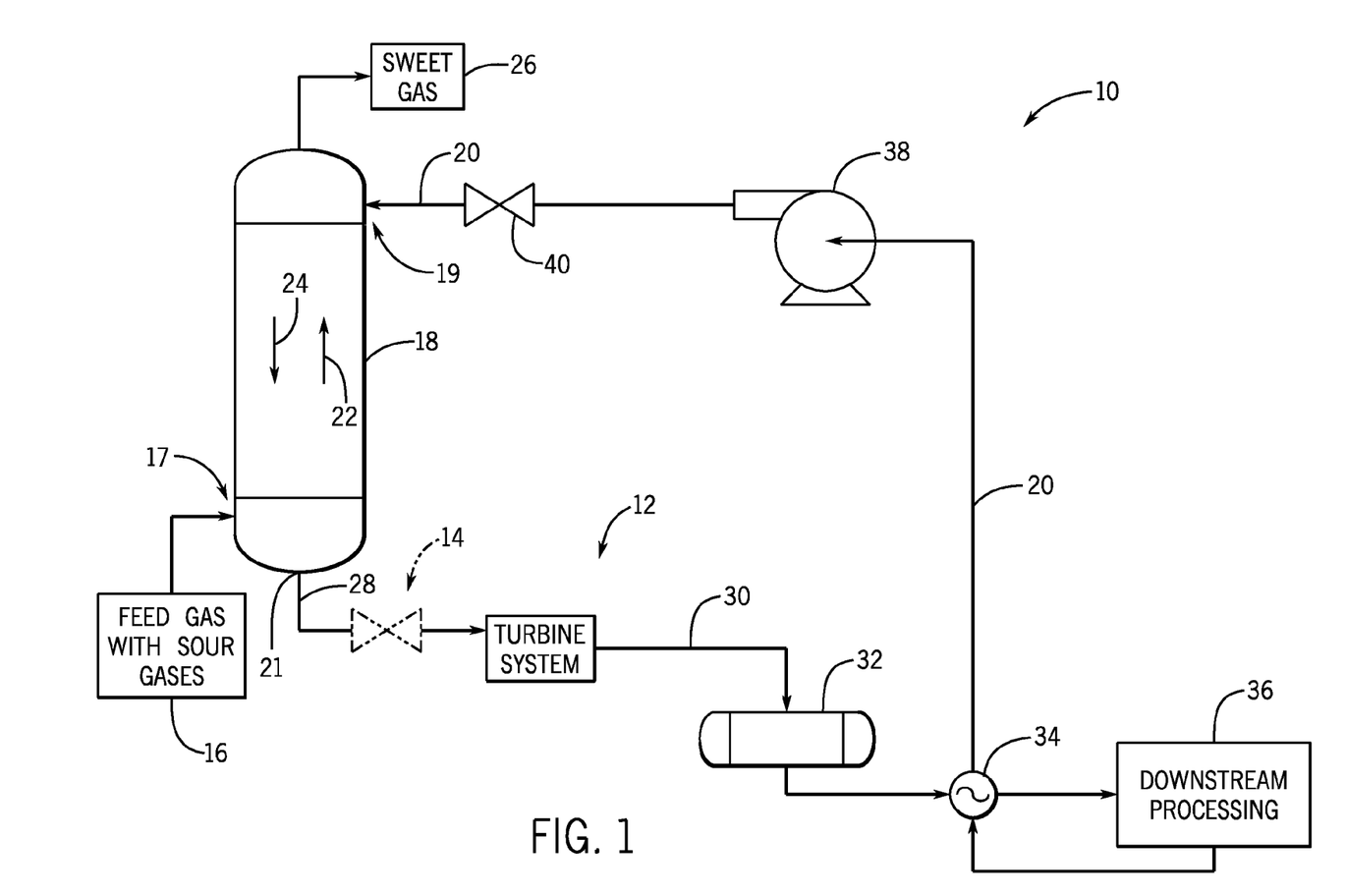
FIG. 1 is a schematic diagram of an embodiment of an acid gas removal system, depicting a turbine system configured to received a high pressure fluid from a high pressure reaction vessel.

With the forgoing in mind, FIG. 1 is a schematic diagram of an embodiment of an acid gas removal system 10 with a turbine system 12. The turbine system 12 includes a turbine 10 (e.g., hydraulic turbine, liquid turbine, etc.) and one or more valves, as further described with respect to FIGS. 2-5. In particular, as noted above, the turbine system may be configured to replace a pressure reducing valve 14 disposed within typical acid gas removal systems, as further described in detail below. Further, while the system and methods described herein are generally described with regard to a specific type of acid gas removal system (e.g., natural gas processing using an aqueous solvent solution), it should be noted that the techniques and mechanisms described might be utilized with any acid gas removal system 10. For example, the embodiments described herein may be utilized with any acid gas removal system 10 having a pressure reducing valve 14 that may be replaced with the turbine system 12. Indeed, as noted above, utilizing the turbine system 12 in the place of the pressure reducing valve 14 may help increase efficiency of the system 10, and may help recover a portion of the pressure energy generated and convert the generated pressure energy into rotational mechanical energy.

In certain embodiments, the acid gas removal system 10 includes a desired feed gas 16 that is provided to a base 17 of a high pressure reaction vessel 18. The feed gas 16 may be any type of gas that includes sour gas components (e.g., acid gases). For example, types of feed gas 16 may include natural gas (e.g., ethane, propane, etc.) derived from natural geological reservoirs, syngas, or generally any type of gas with acid gas components. Sour gas components of the feed gas 16 may include carbon dioxide, hydrogen sulfide, mercaptans (e.g., methanethiol, ethanethiol, etc.), and so forth. In certain embodiments, the feed gas 16 may enter the high pressure reaction vessel 18 at pressures between approximately 300 psig and 2200 psig. In addition, the temperature of the feed gas 16 as it enters the high pressure reaction vessel 18 may be approximately between 26 degrees and 38 degrees Celsius. Furthermore, the acid gas removal system 10 includes a lean solvent solution 20 (e.g., lean solvent aqueous solution, lean solvent solution, water based lean solvent solution, etc.) that is provided generally near a top 19 of the high pressure reaction vessel 18 at generally low temperatures. In certain embodiments, the temperature of the lean solvent solution 20 as it enters the high pressure reaction vessel 18 may be between approximately 32 degrees and 43 degrees Celsius or between approximately 38 degrees or 49 degrees Celsius. Indeed, in certain embodiments, the temperature of the lean solvent solution 20 may be anywhere between 30 degrees and 50 degrees Celsius, at temperatures higher than the feed gas temperatures 16, in order to help avoid condensation of the heavier components of the feed gas 16. As the feed gas 16 moves in an upward direction 22 within the high pressure high pressure reaction vessel 18, the feed gas 16 makes contact with the lean solvent solution 20 in an exothermic process.

Accordingly, in certain embodiments, the lean solvent solution 20 heats up in the exothermic process, and the sour gas components of the feed gas 16 may be transferred from the feed gas 16 to the lean solvent solution 20 as the lean solvent solution moves in the downward direction 24 within the high pressure high pressure reaction vessel 18. In this manner, sweet gas 26 (e.g., clean gas 26) exits the high pressure reaction vessel. Specifically, the sweet gas 26 may be the desired feed gas 16 void of the sour gas components. Further, the lean solvent solution 20 absorbs the sour gas components, and exits the high pressure reaction vessel 18 at high pressures (e.g., approximately between 1000 psi and 1500 psi) and generally high temperatures (e.g., between approximately 55 degrees and 65 degrees Celsius) as a high pressure rich solvent 28. As noted above, it may be beneficial to recycle and recirculate the solvent solution within the acid gas removal system 10. Accordingly, in certain embodiments, the high pressure rich solvent 28 is further processed to strip the sour gas components to generate the lean solvent solution 20. Therefore, in certain embodiments, the pressure of the high pressure rich solvent 28 may be reduced to strip the sour gas components. Also in certain embodiments, the temperature of the high pressure rich solvent 28 may be increased to strip the sour gas components.

Figure 2:
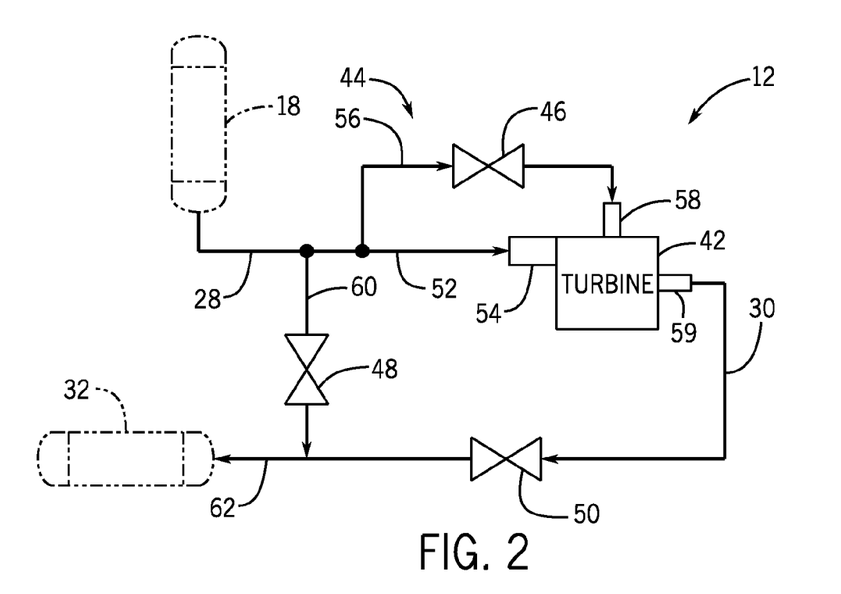
FIG. 2 is a schematic diagram of an embodiment of the turbine system of FIG. 1, where the turbine system includes an auxiliary nozzle valve, a bypass valve, and a throttle valve.
Figure 3:
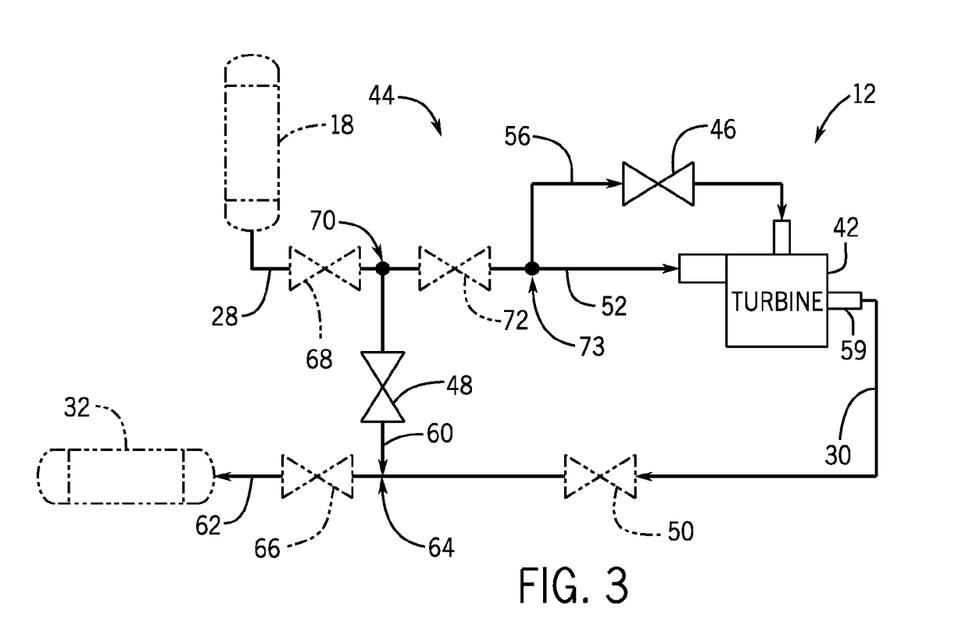
FIG. 3 is a schematic diagram of an embodiment of the throttle valve of the turbine system of FIG. 2, where the throttle valve is disposed in different positions within the turbine system.
Figure 4:
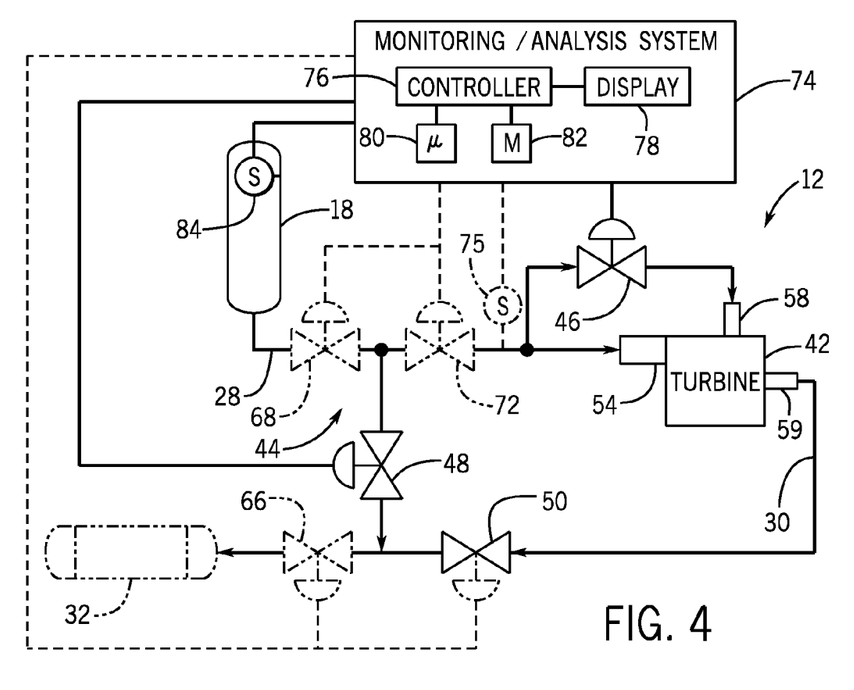
FIG. 4 is a schematic diagram of an embodiment of the turbine system of FIG. 2, where one or more valves of the turbine system are coupled to a monitoring/analysis system.

The turbine system 12 may be configured to reduce the pressure of the high pressure rich solvent 28, as further described with respect to FIGS. 2-4. For example, in certain embodiments, the pressure of the high pressure rich solvent 28 may be reduced to between approximately 25 psig and 100 psig. Accordingly, the low pressure rich solvent 30 exiting from the turbine system 12 may be routed to a flash tank 32. The flash tank 32 may be configured to flash and recover desired components of the low pressure rich solvent 30, such as any remaining hydrocarbon gases. Further, the low pressure rich solvent 30 may be then routed to a heat exchanger 34, and to further downstream processing 36. The downstream processing 36 is configured to strip the low pressure rich solvent 30 of the sour gas components. In certain embodiments, the downstream processing 36 may include a regenerator circuit, where the sour gas components are stripped from the low pressure rich solvent 30 with the application of heat to generate the lean solvent solution 20. In certain embodiments, the heat exchanger 34 is configured to exchange heat between the low pressure rich solvent 30 entering heat exchanger 34 and the lean solvent solution 20 that exits the downstream processing unit 36. Further, the lean solvent solution 20 exiting the heat exchanger 34 enters a lean solvent pump 38 that is configured to increase the pressure of the lean solvent solution 20 to the pressure of the high pressure reaction vessel 18 (e.g., from between approximately 25 psig and 100 psig to between approximately 1000 psig and 1200 psig). The lean solvent solution 20 is then routed back to the high pressure reaction vessel 18 when a lean solvent valve 40 is configured to open. In certain embodiments, the energy needed to increase the pressure of the lean solvent solution 20 may be derived from the energy generated by the turbine system 12.

FIG. 2 is a schematic diagram of an embodiment of the turbine system 12 of FIG. 1, where the turbine system 12 includes a turbine 42 and one or more valves 44. In the illustrated embodiment, the valves 44 include auxiliary nozzle valve 46, a bypass valve 48, and a throttle valve 50. In particular, the valves 44 may be configured to regulate the flow of the high pressure rich solvent 28 exiting from the high pressure reaction vessel 18 and routed into the turbine 42. It should noted that control of the solvent recirculation process within the acid gas removal system 10 may be regulated by controlling the flow of the lean solvent solution 20 and the flow of the high pressure rich solvent 28 exiting the high pressure reaction vessel 18. In this manner, the turbine system 12 may be configured to help control the overall process of the acid gas removal system 10 by regulating and providing resistance to the flow exiting the high pressure reaction vessel 18. Indeed, the valves 44 may work concurrently to simultaneously control and/or regulate the flow of the high pressure rich solvent 28 exiting the high pressure reaction vessel 18 and the flow of the high pressure rich solvent 28 entering the turbine 42.

In certain embodiments, the high pressure rich solvent 28 may be routed directly from the high pressure reaction vessel 18 and into the turbine 42 via a main flow path 52 leading to a main nozzle 54 (e.g., primary nozzles 54) of the turbine 42. Indeed, the main nozzle 54 may be continuously open to the stream of the high pressure rich solvent 28 exiting from the high pressure reaction vessel 18 without any elements configured to restrict or control the flow. In certain embodiments, it may be necessary to increase the amount of flow exiting the high pressure reaction vessel 18 and entering the turbine 42. In these situations, the auxiliary nozzle valve 46 may be opened or engaged to increase the amount of flow into the turbine 42. For example, in certain situations, an auxiliary flow path 56 may branch off from the main flow path 52 and route a portion of the high pressure rich solvent into an auxiliary nozzle 58 via the auxiliary nozzle valve 46. When the auxiliary nozzle valve 46 is fully opened, the turbine 42 may be configured to receive the maximum amount of high pressure rich solvent 28 exiting from the high pressure reaction vessel 18. It should be noted that in some embodiments, the auxiliary nozzle valve 46 may be partially opened, so an amount of high pressure rich solvent 28 is removed from the high pressure reaction vessel 18 and is routed to the turbine 42. As noted above, the amount of high pressure rich solvent 28 routed into the turbine 42 may be dependent on the desired operating parameters of the overall recirculative process of the acid gas removal system 10. For example, when the liquid level in the high pressure reaction vessel increases beyond the acceptable limits, high pressure reaction vessel, a greater amount of high pressure rich solvent 28 may be required to be removed from the high pressure reaction vessel 18 in order to control the liquid level in the high pressure reaction vessel 18.

In certain embodiments, the turbine system 12 may be configured to handle a broader range of flow capacities. For example, in some situations, the turbine system 12 may be configured to handle additional flow exiting from the high pressure reaction vessel 18, such as flow surpassing the maximum flow that the main flow path 52 and auxiliary flow path 56 can handle. In these situations, the bypass valve 48 may be fully or partially opened to handle the overflow of the high pressure rich solvent 28 exiting from the high pressure reaction vessel 18. In particular, a bypass flow path 60 may branch from the main flow path 52 to route a portion of the high pressure rich solvent 28 directly from the high pressure reaction vessel 18 to a flow path downstream of the turbine 42. The high pressure reaction vessel 18 may include an outlet 21 through which the high pressure rich solvent 28 exits the high pressure reaction vessel 18. In certain embodiments, the bypass flow path 60 may route the high pressure rich solvent 28 to an exit flow path downstream of the turbine 42 and the throttle valve 50. In certain embodiments, the throttle valve 50 may also be utilized to improve the range of flows the turbine system 12 can manage. For example, in some situations, the turbine system 12 may be configured to handle a smaller amount of flow, such as flow falling below the minimum flow that the main flow path 52 is configured to handle. In these situations, the throttle valve 50 may be fully or partially closed to handle the decrease flow of the high pressure rich solvent 28 exiting from the high pressure reaction vessel 18. For example, closing the throttle valve 50 may help provide additional resistance within the turbine system 12. As noted above, the turbine 42 is generally configured to reduce the pressure of the high pressure rich solvent 28, and output the low pressure rich solvent 30 through the turbine outlet 59 and to the exit flow path 62.

In certain embodiments, a plurality of auxiliary nozzle valves 46, auxiliary flow paths 56, and auxiliary nozzles 58 may be provided and configured with the turbine 42. For example, one or more auxiliary nozzle valves 46 (e.g., 2, 3, 4, 5, 6, or more) and corresponding auxiliary flow paths 56 and auxiliary nozzles 58 may be configured with the turbine 42. Furthermore, it should be noted that in some situations, a plurality of turbine systems 12 (e.g., 2, 3, 4, 5, 6, or more) may be provided within the acid gas removal system 10. In these situations, the main flow path 52 exiting the high pressure reaction vessel 18 may be split into a plurality of main flow paths 52. Each one of the plurality of main flow paths 52 may lead to a particular turbine system 12 of the plurality of turbine system 12.

FIG. 3 is a schematic diagram of an embodiment of the throttle valve 50 of the turbine system 12 of FIG. 2, where the throttle valve 50 is disposed in different positions within the turbine system 12. For example, as noted above with respect to FIG. 2, the throttle valve 50 may be disposed along the exit flow path 62 downstream of the turbine 42 and upstream of a first joining point 64 between the bypass flow path 60 and outlet 59. In other embodiments, a throttle valve 66 may be disposed along the exit flow path 62 downstream of the turbine 42 and the joining point 64. In certain embodiments, a throttle valve 68 may be disposed downstream of the high pressure reaction vessel 18 and upstream of a second joining point 70 between the main flow path 52 and the bypass flow path 60. Further, in certain embodiments, a throttle valve 72 may be disposed downstream of the second joining point 70, upstream of the turbine 42, and upstream of a third joining point 73 before the main flow path 52 and the auxiliary flow path 56. In other embodiments, the throttle valve 72 may be disposed downstream of the second joining point 70, upstream of the turbine 42, and downstream of the third joining point 73.

In certain embodiments, the throttle valves 50 or 66 may be configured to increase the resistance within the turbine system 12 by restricting the flow exiting from the turbine 42, thereby providing the turbine system 12 with a mechanism to handle low flow profiles. The throttle valves 68 and 72 may be configured to increase resistance and limit the flow of the high pressure rich solvent 28 from the high pressure reaction vessel 18. Further, it should be noted that the throttle valves 50, 66, 68, and 72 may be utilized in any combination, to regulate and route the flow of the high pressure rich solvent 28 in the manner desired. For example, in certain embodiments, the throttle valve 72 may be closed to limit the flow of the high pressure rich solvent 28 to the turbine 42 and may direct the high pressure rich solvent 28 to the exit flow path 62. It should be noted that in other embodiments, any number of valves 44 may be disposed upstream or downstream of the turbine 42, in order to help provide the turbine system 12 handle a broader range of flow profiles. Further still, additional mechanisms may be provided to the turbine system 12 with a further nuanced control of the high pressure rich solvent 28 flow, as further described with respect to FIG. 4.

FIG. 4 is a schematic diagram of an embodiment of the turbine system of FIG. 2, where one or more valves of the turbine system 12 are coupled to a monitoring/analysis system 74. The monitoring/analysis system 74 may include a controller 76 coupled to a display 78, one or more processors 80, and a memory 82. The controller 76 may be configured to communicate with and collect information from one or more components of the turbine system 12, such as the one or more valves 44 or one or more sensors 75. For example, in certain embodiments, the controller 76 may be configured to regulate and control one or more operating parameters of the turbine system 12.

In certain embodiments, the processor 80 may include one or more processing devices, and the memory 82 may include one or more tangible, non-transitory, machine-readable media collectively storing instructions executable by the processor 80 to perform the methods and control actions described herein.

Such machine-readable media can be any available media that can be accessed by the processor or by any general purpose or special purpose computer or other machine with a processor. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor or by any general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause the processor or any general purpose computer, special purpose computer, or special purpose processing machines to perform a certain function or group of functions.

For example, in certain embodiments, the controller 76 may be configured to communicate with electric actuators, switches (e.g., Hall switches, solenoid switches, relay switches, limit switches), and so forth, that may be coupled to each of the one or more valves 44. In this manner, the controller 76 may be configured to open, close, partially open, or partially close any of the valves 44, based on the desired flow profiles throughout the acid gas removal system 10. Further, in certain embodiments, the controller 76 may be configured to communicate with a variety of sensing devices 75 disposed throughout the turbine system 12 and the acid gas removal system 10. The sensing devices 75 may include, flow meters, temperature sensors, vibration sensors, clearance sensors, pressure sensors, or other sensors configured to sense an operating parameter of the acid gas removal system 10. For example, the sensing devices 75 may be configured to sense temperature, pressure, flow rate, reaction rates, and so forth, of the high pressure rich solvent 28, the low pressure rich solvent 30, the lean solvent solution 20, the feed gas 16, and so forth. In some embodiments, the sensing devices 75 may be disposed within the turbine system 12, such as along the flow paths 52, 56, 60, or 62 of the turbine system 12.

In certain embodiments, particular types of sensing devices 75 may be disposed within other components of the acid gas removal system 10, such as within the high pressure reaction vessel 18. For example, the high pressure reaction vessel 18 may include a level transmitter 84 configured to monitor various operating parameters of the high pressure reaction vessel 18. In certain situations, the level transmitter 84 may be configured to provide information related to the exothermic process within the contractor 18 between the lean solvent solution 20 and the feed gas 16. The information gathered by the level transmitter and transmitted to the controller 76 may include information related to the temperature, pressure, reaction rate, amount of sweet gas 26 generated, amount of high pressure rich solvent 28 generated, and so forth. In particular, the level transmitter 84 and various other sensing devices 75 that may be disposed within the high pressure reaction vessel 18 may be utilized to determine the amount of high pressure rich solvent 28 that is routed out of the high pressure reaction vessel 18.

Further, based on the information or feedback received from the level transmitter 84 and/or other sensing devices 75, the controller 76 may be configured to regulate the valves 44 in order to achieve the desired flow profiles. For example, if the controller 76 receives information that the amount of the high pressure rich solvent routed out of the high pressure reaction vessel 18 is greater than the flow capacity or the flow limit that the main nozzle 54 can handle, the controller 76 may be configured to open or partially open the auxiliary nozzle valve 46. Likewise, if the controller 76 receives information or feedback that the amount of the high pressure rich solvent routed out of the high pressure reaction vessel 18 is less than the flow capacity or flow limit that the main nozzle 54 can handle, the controller 76 may be configured to close or partially close the auxiliary nozzle valve 46. Furthermore, if the controller 76 receives information that the amount of the high pressure rich solvent routed out of the high pressure reaction vessel high pressure reaction vessel 18 is greater than approximately 10%-20% of the flow capacity that the auxiliary nozzle 58 can handle, the controller 76 may be configured to open or partially open the bypass valve 48. Likewise, if the controller 76 receives information or feedback that the amount of the high pressure rich solvent routed out of the high pressure reaction vessel high pressure reaction vessel 18 is less than approximately 10%-20% of the flow capacity that the auxiliary nozzle 58 can handle, the controller 76 may be configured to close or partially close one or more throttle valves 50, 66, 68, 72. It should be noted that in other embodiments, other types of sensing information may also be utilized (e.g., level transmitter 84 information) to control the valves 44 in a manner that improves the overall efficiency of the turbine system 12. It should be noted that the ranges provided related to the flow capacity and limits handled by each of the valves 44 is for illustrated purposes, and the ranges that each valve operates within may vary depending on the desired overall system efficiency.

For example, in certain situations, such as when the turbine system 12 receives an amount of high pressure rich solvent 28 that is less than the operating capacity or limit of the main nozzle 54, the bypass valve 48 may be closed, the auxiliary nozzle valve 46 may be closed, and the throttle valve 50 may be either fully or partially closed. If information or feedback is received by the controller 76 related to an increase in output of the high pressure reaction vessel 18, various valves 44 may be configured to open to accommodate the additional flow. For example, with increasing amount of flow, the throttle valve 50 may be configured to open to the enable the turbine 42 to output a stream of low pressure rich solvent 30. Further, depending on the amount of additional flow, the auxiliary vale 46 and/or the bypass valve 48 may also be configured to open.

Further, it should be noted that the valves 44 may be operated in any combination, and the valves 44 may have overlapping ranges of operation. For example, in certain situations, the auxiliary nozzle valve 46 may be configured to open before the throttle valve 50 is completely open, at the same time that the throttle valve 50 is configured to open, or after the throttle valve 50 is configured to open. Likewise, the bypass valve 48 may be configured to open before the auxiliary nozzle valve 46 is configured to open, at the same time that the auxiliary nozzle valve 46 is configured to open, or after the auxiliary nozzle valve 46 is configured to open.

In certain embodiments, the monitoring/analysis system 74 may allow for operator interaction with the acid gas removal system 10. For example, the display 78 of the monitoring/analysis system 74 includes a human-machine interface (e.g., HMI), which may be utilized by an operator to receive sensing information or manual instructions. In particular, the HMI may include user inputs/outputs configured to receive or provide information from an operator. For example, in certain situations, an operator may be configured to enter operational ranges for each of the valves 44. Further, the display 78 may be utilized to display information received from the sensing devices 75 or information generally related to any component of the turbine system 12 or the acid gas removal system 10.

Figure 5:
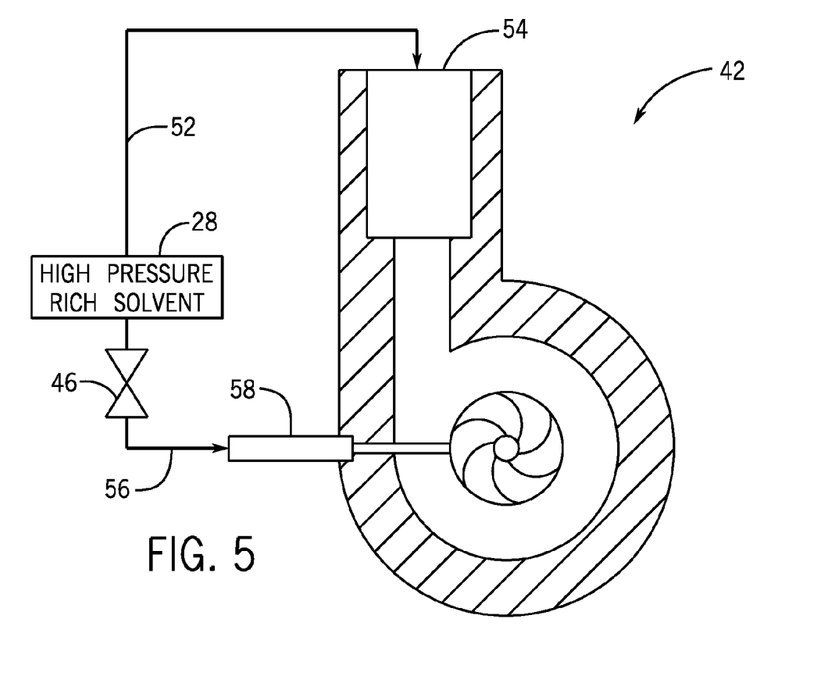
FIG. 5 is a perspective view of an embodiment of a turbine disposed within the turbine system of FIG. 2.

FIG. 5 is a perspective view of an embodiment of the turbine 42 (e.g., liquid turbine) disposed within the turbine system 12 of FIG. 2. In particular, the turbine 42 includes the main nozzle 54 configured to directly receive the high pressure rich solvent 28 via the main flow path 52. Further, the turbine 42 includes the auxiliary nozzle 58 configured to receive the high pressure rich solvent 28 via the auxiliary flow path 56, and which is regulated by the auxiliary nozzle valve 46.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a solvent gas processing system, comprising:
a high pressure reaction vessel configured to remove an acid gas from an untreated feed gas using a solvent in a lean solvent fluid stream, wherein the high pressure reaction vessel is configured to output a treated clean gas and a first flow of a high pressure fluid stream via a first flow path;
a turbine having a main nozzle, an auxiliary nozzle, and an outlet, wherein the main nozzle is configured to receive a second flow of the high pressure fluid stream from the first flow path via a main flow path, and wherein the second flow of the high pressure fluid stream is a portion of the first flow, and wherein the high pressure fluid stream is configured to drive the turbine;
an auxiliary nozzle valve disposed along an auxiliary flow path, wherein the auxiliary nozzle valve is configured to control a third flow of the high pressure fluid stream into the auxiliary nozzle of the turbine, and wherein the third flow of the high pressure fluid stream is a portion of the first flow;
a first throttle valve disposed along an outlet flow path, wherein the first throttle valve is configured to control a fourth flow of a low pressure fluid stream out of the outlet; and
a bypass valve disposed along a bypass flow path, wherein the bypass flow path routes a portion of the high pressure fluid stream from the first flow path directly to the outlet flow path.

2. The system of claim 1, wherein the auxiliary nozzle valve is configured to open or partially open when the first flow or a desired first flow of the high pressure fluid stream is greater than a first flow capacity of the main nozzle.

3. The system of claim 2, wherein the auxiliary nozzle valve is configured to close or partially close when the first flow or the desired first flow of the high pressure fluid stream is less than the first flow capacity of the main nozzle.

4. The system of claim 1, wherein the bypass valve is configured to open or partially open when the third flow or a desired third flow of the high pressure fluid stream is greater than a second flow capacity of the auxiliary nozzle.

5. The system of claim 1, wherein the first throttle valve is configured to close or partially close when the first flow or a desired first flow of the high pressure fluid stream is less than a first flow capacity of the main nozzle.

6. The system of claim 5, wherein the first throttle valve is configured to close or partially close when the fourth flow or a desired fourth flow of the low pressure fluid stream from the outlet is less than a third flow capacity of the outlet.

7. The system of claim 1, comprising a second throttle valve disposed along the main flow path or the first flow path, wherein the second throttle valve is configured to control the flow of the high pressure fluid stream from the high pressure reaction vessel.

8. The system of claim 1, wherein the turbine is configured to receive a first pressure of the high pressure fluid stream and output a second pressure of the low pressure fluid stream, and wherein the turbine is configured to generate rotational mechanical energy based on the difference between the first pressure and the second pressure.

9. The system of claim 1, comprising a controller configured to receive feedback related to at least one operating parameter of the system, wherein the controller is configured to adjust an operating parameter of the system to control the first flow of the high pressure stream.

10. A system, comprising:
a high pressure reaction vessel configured to remove an acid gas from an untreated feed gas using a solvent in a lean solvent stream, wherein the high pressure reaction vessel is configured to output a treated clean gas and a first flow of a high pressure fluid stream via a first flow path; and
a solvent gas processing controller comprising at least one processor, and a memory configured to execute instructions stored on the memory, wherein the at least one processor is configured to:
receive feedback from one or more sensors disposed throughout a solvent gas processing system related to one or more operating parameters of the solvent gas processing system;
determine whether the first flow of the high pressure fluid stream from the high pressure reaction vessel and into a turbine system is within an operational flow range for a main nozzle of the turbine system based on the received feedback;
open an auxiliary nozzle valve if the first flow of the high pressure fluid stream exceeds the operational flow range; and
close the auxiliary nozzle valve if the first flow of the high pressure fluid stream falls below the operational flow range;
wherein the one or more sensors comprises a level transmitter disposed within the high pressure reaction vessel, and wherein the level transmitter is configured to transmit information related to the first flow of the high pressure fluid stream.

11. The system of claim 10, wherein the one or more operating parameters of the system comprises a pressure, a flow rate, a temperature, or a combination thereof.

12. The system of claim 10, wherein the controller is configured to adjust a bypass valve or a throttle valve to increase or decrease the first flow of the high pressure fluid stream into the turbine system.

13. The system of the claim 12, wherein the controller is configured to adjust the throttle valve to increase or decrease a second flow of a low pressure fluid stream exiting the turbine system.

14. The system of claim 10, wherein the controller comprises a display having user inputs and outputs configured to receive the operational flow range from an operator.

15. A method, comprising:
removing an acid gas from an untreated feed gas within a high pressure reaction vessel, wherein the high pressure reaction vessel is configured to output a treated clean gas and a first flow of a high pressure fluid stream via a first flow path;
receiving the first flow of the high pressure stream from the high pressure reaction vessel via a turbine system, wherein the high pressure stream is configured to drive the turbine system;

determining, via a solvent gas processing controller, whether the first flow of the high pressure fluid stream falls within an operational flow range of a main nozzle of the turbine system;

adjusting one or more operational parameters of the turbine system if the first flow of the high pressure fluid stream falls outside of the operational flow range of the main nozzle;

controlling an auxiliary nozzle valve, a bypass valve, or a throttle valve to increase or decrease the first flow of the high pressure fluid stream to the turbine system if the first flow of the high pressure fluid stream falls outside of the operational flow range of the main nozzle; and controlling the bypass valve or the throttle valve to increase or decrease the first flow of the high pressure stream to the turbine system if the first flow of the high pressure fluid stream falls outside of the operational flow range of the main nozzle and a second operational flow range of the auxiliary nozzle.

16. The method of claim 15, wherein adjusting the one or more operational parameters comprises controlling the first flow of the high pressure fluid stream through the turbine system.

17. A system, comprising:
a solvent gas processing system, comprising:
  a high pressure reaction vessel configured to remove an acid gas from an untreated feed gas using a solvent in a lean solvent fluid stream, wherein the high pressure reaction vessel is configured to output a treated clean gas and a first flow of a high pressure fluid stream via a first flow path;
  a turbine having a main nozzle, an auxiliary nozzle, and an outlet, wherein the main nozzle is configured to receive a second flow of the high pressure fluid stream from the first flow path via a main flow path, and wherein the second flow of the high pressure fluid stream is a portion of the first flow, and wherein the high pressure fluid stream is configured to drive the turbine;
  an auxiliary nozzle valve disposed along an auxiliary flow path, wherein the auxiliary nozzle valve is configured to control a third flow of the high pressure fluid stream into the auxiliary nozzle of the turbine, and wherein the third flow of the high pressure fluid stream is a portion of the first flow; and
  a first throttle valve disposed along an outlet flow path, wherein the first throttle valve is configured to control a fourth flow of a low pressure fluid stream out of the outlet, and wherein the first throttle valve is configured to close or partially close when the first flow or a desired first flow of the high pressure fluid stream is less than a first flow capacity of the main nozzle.

18. A system, comprising:
a solvent gas processing system, comprising:
  a high pressure reaction vessel configured to remove an acid gas from an untreated feed gas using a solvent in a lean solvent fluid stream, wherein the high pressure reaction vessel is configured to output a treated clean gas and a first flow of a high pressure fluid stream via a first flow path;
  a turbine having a main nozzle, an auxiliary nozzle, and an outlet, wherein the main nozzle is configured to receive a second flow of the high pressure fluid stream from the first flow path via a main flow path, and wherein the second flow of the high pressure fluid stream is a portion of the first flow, and wherein the high pressure fluid stream is configured to drive the turbine;
  an auxiliary nozzle valve disposed along an auxiliary flow path, wherein the auxiliary nozzle valve is configured to control a third flow of the high pressure fluid stream into the auxiliary nozzle of the turbine, and wherein the third flow of the high pressure fluid stream is a portion of the first flow;
  a first throttle valve disposed along an outlet flow path, wherein the first throttle valve is configured to control a fourth flow of a low pressure fluid stream out of the outlet; and
  a second throttle valve disposed along the main flow path or the first flow path, wherein the second throttle valve is configured to control the flow of the high pressure fluid stream from the high pressure reaction vessel.

19. A system, comprising:
a high pressure reaction vessel configured to remove an acid gas from an untreated feed gas using a solvent in a lean solvent stream, wherein the high pressure reaction vessel is configured to output a treated clean gas and a first flow of a high pressure fluid stream via a first flow path; and
a solvent gas processing controller comprising at least one processor, and a memory configured to execute instructions stored on the memory, wherein the at least one processor is configured to:
  receive feedback from one or more sensors disposed throughout a solvent gas processing system related to one or more operating parameters of the solvent gas processing system;
  determine whether the first flow of the high pressure fluid stream from the high pressure reaction vessel and into a turbine system is within an operational flow range for a main nozzle of the turbine system based on the received feedback;
  open an auxiliary nozzle valve if the first flow of the high pressure fluid stream exceeds the operational flow range;
  close an auxiliary nozzle valve if the first flow of the high pressure fluid stream falls below the operational flow range; and
  adjust a bypass valve or a throttle valve to increase or decrease the first flow of the high pressure fluid stream into the turbine system.

20. A system, comprising:
a high pressure reaction vessel configured to remove an acid gas from an untreated feed gas using a solvent in a lean solvent stream, wherein the high pressure reaction vessel is configured to output a treated clean gas and a first flow of a high pressure fluid stream via a first flow path; and
a solvent gas processing controller comprising at least one processor, and a memory configured to execute instructions stored on the memory, wherein the at least one processor is configured to:
  receive feedback from one or more sensors disposed throughout a solvent gas processing system related to one or more operating parameters of the solvent gas processing system;
  determine whether the first flow of the high pressure fluid stream from the high pressure reaction vessel and into a turbine system is within an operational flow range for a main nozzle of the turbine system based on the received feedback;

open an auxiliary nozzle valve if the first flow of the high pressure fluid stream exceeds the operational flow range; and close an auxiliary nozzle valve if the first flow of the high pressure fluid stream falls below the operational flow range;

wherein the controller comprises a display having user inputs and outputs configured to receive the operational flow range from an operator.

\* \* \* \* \*